Dec. 17, 1957    R. W. JENSEN    2,816,729
SHUT-OFF VALVE OF THE BUTTERFLY TYPE
Filed Feb. 26, 1953    2 Sheets-Sheet 1
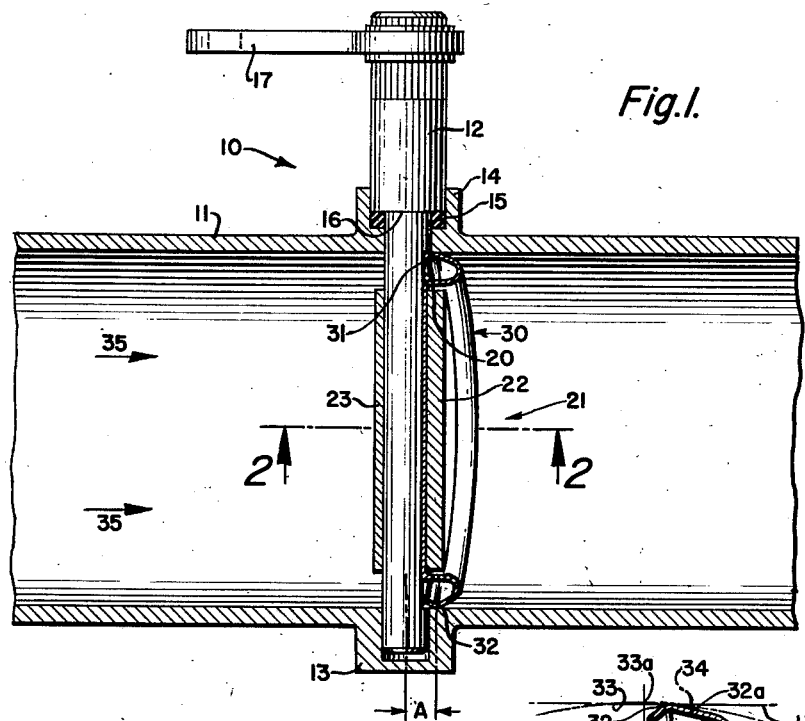
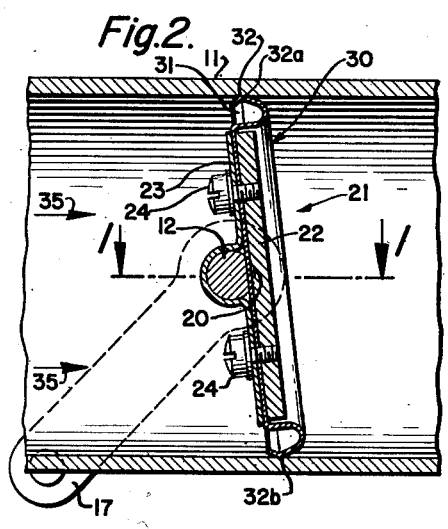
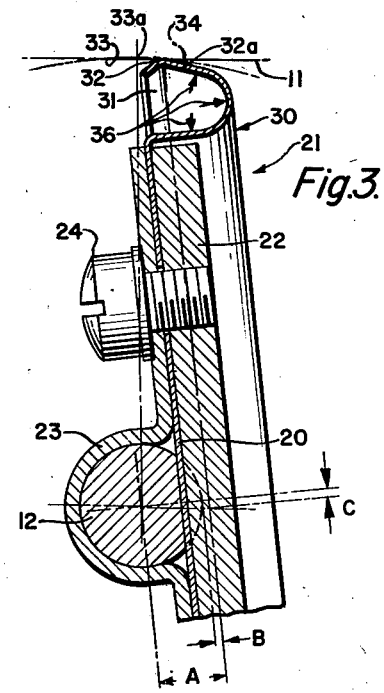
INVENTOR.
RAYMOND W. JENSEN,
BY Dec. 17, 1957  R. W. JENSEN  2,816,729
SHUT-OFF VALVE OF THE BUTTERFLY TYPE
Filed Feb. 26, 1953  2 Sheets-Sheet 2
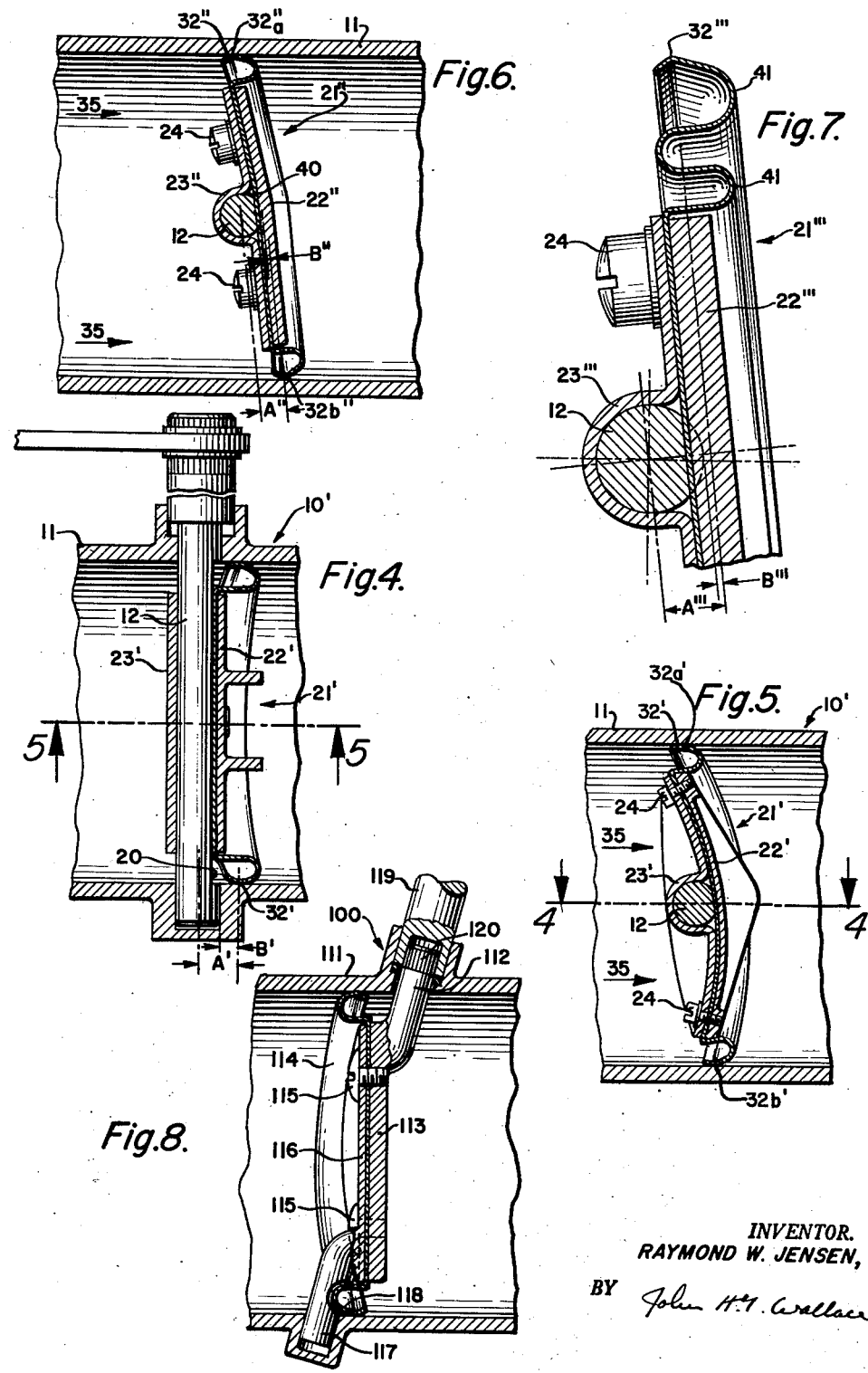
INVENTOR.
RAYMOND W. JENSEN,
BY John H. Wallace United States Patent Office 2,816,729
Patented Dec. 17, 1957

2,816,729

SHUT-OFF VALVE OF THE BUTTERFLY TYPE

Raymond W. Jensen, Encino, Calif., assignor to The Garrett Corporation, Los Angeles, Calif., a corporation of California Application February 26, 1953, Serial No. 339,128

12 Claims. (Cl. 251—75)

This invention relates to a shut-off valve of the type generally known as butterfly valves, and has particular reference to a novel butterfly construction whereby an improved seal between the butterfly and its housing is achieved when the valve is in its closed position.

This application is a continuation-in-part of my application Serial No. 70,696, entitled Shut-Off Valve, filed January 13, 1949, now abandoned.

Butterfly valves of the prior art have been unsatisfactory in that it has been difficult to obtain a satisfactory shut-off of fluid flow in the valve-closed position due to undesired clearance space between the conventional butterfly and its housing. Precision machining of the housing interior and butterfly edge has been resorted to in an effort to overcome this deficiency, but often with indifferent success, primarily because of expansion and contraction caused by temperature conditions. Such precision machining of the housing and butterfly had to be predicated on certain arbitrary temperature design characteristics for a particular valve, otherwise the butterfly might bind in the housing or else the clearance might be so great as to make the valve useless if the temperature of the ambient medium or of the fluid being controlled departed to any great extent from the selected temperatures for which the valve was designed.

In aircraft work, for example, in one particular known use, it is desirable that the valve be capable of working in ambient atmospheric temperatures ranging upwardly from say, —50° F. to approximately 250° F., and that the valve be capable of controlling fluids at temperatures up to 600° F. and higher. It has been found that a butterfly valve of the conventional type is incapable of satisfactory shut-off of fluid flow within such extensive temperature variations, and it has been necessary to resort to other more complex, bulky or more cumbersome types of valves to accomplish satisfactory fluid control.

It is therefore an object of this invention to overcome the deficiencies of the butterfly valves of the prior art and to provide a light-weight, compact valve capable of controlling fluid flow within a wide range of operating temperatures.

It is a further object to provide a valve of the butterfly type with minimal or no leakage from the high pressure side to the low pressure side when the valve is closed, and which is capable of performing its functions within wide variations of temperatures of the ambient medium and of the fluid being controlled.

It is a further object of this invention to provide a valve of the type disclosed wherein the butterfly is formed of a resilient, spring-like material having a spun, rolled or otherwise formed rim having a loop or bight portion of a partially toroidal cross-section, somewhat larger in major diameter than the inside diameter of its housing, and which rim is deflectable radially inwardly when assembling the valve, the inherent resiliency tending to expand the rim outwardly to form a tight seal with the housing when the valve is in the closed position.

It is another object to provide a valve wherein the plane or line of contact of the butterfly and housing is offset from the axis of the operator shaft a sufficient amount that there exists no unsealed points of leakage for the fluid from the high pressure side of the butterfly to the low pressure side where the shaft passes into and through the housing.

It is another object to provide a butterfly valve wherein the line of contact of the closed butterfly with the housing passes about or clears the operator shaft, in order that there may be no discontinuity in the seal afforded between the butterfly and the housing.

It is a further object to provide improved sealing means between the butterfly housing and the operator shaft where the latter passes through or into the wall of the housing.

It is a further object to provide an improved butterfly element, as an original or replacement article, which may be secured to a valve operator shaft in the housing of a commercially available shut-off valve in lieu of the usual type of butterfly supplied therewith, the said butterfly being characterized by a resilient rim for maintaining continuous circumferential contact with the valve housing in the valve-closed position.

It is another object to provide a butterfly valve having a butterfly element provided with a stiffly resilient, curled rim formed in the shape of a convolution open on one side of the curl and having a free major diameter somewhat larger than the inside diameter of its housing, the rim being deflectable radially inwardly, such a valve being particularly characterized in that the rim curl is initially deflected radially inwardly at the diametrical points of contact of the rim with the bore when the valve is assembled in the valve open position, successive peripheral points of the rim being deflected generally radially inwardly toward the central region of the butterfly as the valve is moved towards the closed position, no portion of the rim curl having any substantial movement transverse to the general plane of the butterfly.

Further objects and advantages of my invention will be apparent to those skilled in the art.

In the drawings and specification there are shown and described preferred embodiments of my invention, but modifications of the structures shown will suggest themselves. Hence, it is not my intention to restrict my invention necessarily to the particular embodiments shown and described.

Referring to the drawings,

Fig. 1 is a partially sectioned view of one form of the valve, taken on line 1—1 of Fig. 2;

Fig. 2 is a sectional view of the valve taken on line 2—2 of Fig. 1;

Fig. 3 is an enlarged detail view of a portion of Fig. 2;

Fig. 4 is a partially sectioned view showing another form of the valve taken on line 4—4 of Fig. 5;

Fig. 5 is a sectional view of the valve depicted in Fig. 4 taken along the line 5—5;

Fig. 6 is a view similar to Fig. 2, but showing another alternate valve construction, and Fig. 7 is a view similar to Fig. 3, but showing an alternate butterfly construction.

Fig. 8 is a partially sectioned view of a further embodiment of the valve.

In Figs. 1 and 2 a valve 10 is shown, comprising a bore or housing 11 in which is disposed a butterfly operator shaft 12, held therein in transverse diametrical alignment by a lower shaft bearing portion 13 and an upper shaft bearing portion 14. Disposed in the upper bearing portion 14 is an O ring packing seal 15, a shoulder 16 of the shaft 12 resting thereagainst to form a seal against escape of fluid past the shaft. The shaft 12 has attached to its upper end by any suitable means a handle or operator link 17 providing means for actuation of the valve.

With the housing, a flat portion 20 of the shaft 12 receives the butterfly 21, there being a backing plate 22 to stiffen the central portion of the butterfly. A retainer plate 23 fits over the shaft and rests against the butterfly 21. Screws 24 pass through the retainer plate 23 and the butterfly 21 and are threadably received in the backing plate 22 to retain the butterfly and shaft in assembled relationship.

The butterfly 21 is formed preferably of a relatively thin stiffly resilient material such as stainless steel, and has a spun or formed rim 30 of a generally semi-toroidal cross-section, a lip 31 forming an obtuse angle with the rim 30 for the purpose of defining a relatively pronounced ridge 32. The butterfly may, however, be formed with the lip 31 lacking the relatively pronounced ridge and as simply a continuation of the uniformly curled portion of rim 30. I prefer to form the butterfly with the ridge 32 as shown in order to reduce the area of rim 30 in contact with the housing, thereby enhancing the snap action of the valve, as will be presently explained, and also reducing the force necessary to operate the valve. The peripheral diameter of ridge 32 is somewhat greater than the inside diameter of the housing, about 0.010 inch, for example in the case of one particular 2-inch valve. Thus when the butterfly is slid edgewise into the housing in the valve assembly operation, a slight radially inward deflection of the rim occurs at the edges adjacent the shaft 12 thereby imparting a slightly elliptical shape to the ridge 32 of rim 30 of the butterfly.

It will be perceived from the drawings that the plane of the contacting ridge 32 does not pass through the shaft but is offset from the center of the shaft a distance A (Fig. 1) which is somewhat greater than the shaft radius by an approximate amount indicated as B in Fig. 3. Assuming the direction of fluid flow to be as shown by the arrows 35, it is now apparent that when the valve is closed there is no possible point of leakage from the high pressure to the low pressure side of the valve past the shaft, since the peripheral line of contact of ridge 32 with the housing 11 is continuous and is downstream of the regions of possible leakage where the shaft passes through the housing.

When the valve is moved from open to closed positions, successive portions of the ridge 32 come to bear against the interior of the housing until the valve is almost closed. Referring to Fig. 3, it will be seen that the upper region 32a of the ridge 32 makes initial contact with the housing at a point indicated by the numeral 33. At that moment the lower region 32b (Fig. 2) of the ridge 32 of the butterfly is not yet in contact with the housing because of a displaced relationship between the butterfly and shaft. As the valve is further closed the upper region 32a tends to move through the arc 34 and hence, is compressed radially inwardly by the housing until it passes its "dead center," indicated by the numeral 33a, after which further closing movement of the valve is assisted by the now-expanding movement of the upper region 32a. This latter phase of the valve action is of the nature of a snap action, and when the lower region 32b thereafter comes into contact with the housing, further closing movement ceases. Figs. 2 and 3 show the valve 10 with a butterfly 21 which fully closes the bore when positioned at less than 90 degrees to the axis of the valve bore. As shown at "C" in the embodiment of Figure 3, a transverse displacement of the butterfly 21 relative to the shaft 12 exists when the butterfly is assembled on shaft 12.

Although the magnitude of the displacement "C" will vary with valves of different dimensions, it has been found that the following procedure gives the proper value of displacement "C" in a given valve.

The holes in butterfly 21, through which the screws 24 pass, are made somewhat larger than the screws, and the butterfly is allowed to assume its optimum fit in the housing when the valve is closed, before the screws 24 are tightened.

The force of upstream fluid pressure against the butterfly is indicated by the small force arrows 36. It is seen that this pressure tends to expand the rim 30 in an outward direction, thereby enhancing the seal between the ridge 32 and the housing. It is believed preferable to build the valve in this manner, with the open side of the convolution facing upstream. In practice, however, it has been found that an effective seal can be obtained with a construction in which the open side of the convolution faces downstream. It is theorized that the unexpected effectiveness of the seal in the latter case may be due to the force of upstream pressure against the closed convoluted face of the butterfly tending to buckle it in such a manner as to expand it radially outwardly against the bore.

Figs. 4 and 5 show an alternate embodiment wherein the butterfly 21' is caused to assume a curved cylindrical shape within the housing by virtue of the curved surfaces of the ribbed backing plate 22' and retaining plate 23', the retaining plate, butterfly, and backing plate being held in assembled relationship on the shaft 12 by screws 24. The cylindrical curve of the butterfly is such that a straight line drawn normal to the shaft axis at its midpoint will pass substantially through the points of contact of the housing 11 with the upper and lower regions 32a' and 32b' of ridge 32' of the rim of the butterfly when the valve is closed. Thus, in this version of the valve, upper and lower regions 32a' and 32b' of ridge 32' contact the housing at the same instant when the valve 10' is moved to its closed position.

In Fig. 6 I have shown a modified version of the valve of Figs. 1 and 2, but wherein the butterfly 21" is dihedrally bent about the shaft 12, on a bend line indicated at 40 by virtue of a bend formed in the backing plate 22" and retaining plate 23". When the valve is assembled, a straight butterfly, such as butterfly 21 of Figs. 1 and 2, is slid into the housing adjacent the shaft 12, after which the screws 24 are passed through retaining plate 23", butterfly 21", and threadably secured in backing plate 22". Drawing up the screws will then obtain the desired bend in the butterfly such that upper and lower regions 32a" and 32b" of ridge 32" contact the housing 11 at the same instant when the valve is moved to its closed position. If desired, the butterfly may have the required bend preformed in it before assembly.

It will be noted in the versions depicted in Figs. 4, 5, and 6 that the snap action obtained with the embodiment of Figs. 1, 2 and 3 is not present, since the regions 32a' and 32a" contact the housing at the same time as their corresponding regions 32b' and 32b" when the valve is closed. Such absence of snap action may be desirable in some instances. In the case of the embodiments shown in Figs. 1, 2 and 3 if it is desirable not to have snap action, as in very large valves where the operating torque required might be excessive, the snap action may be eliminated by the simple expedient of relieving the bore at the region of first contact of the butterfly in closing.

Fig. 7 shows a modified version of the butterfly 21 of Figs. 1 and 2, wherein a butterfly 21''' having a plurality of formed convolutions or bight portions 41 is mounted on a shaft 12 by means of backing plate 22''', retaining plate 23''' and screws 24. A valve of this configuration may be preferable in cases where the butterfly is made of a relatively thicker material, but where it is desired to retain the flexibility of material of a thinner section.

As is the case with the valve shown in Figs. 1 and 2, the valves shown in Figs. 4, 5, 6, and 7 are so constructed that the butterflies 21', 21", and 21''' are offset from the center of the shaft 12 a distance A', A", and A''' greater than the radius of the shaft by an amount which may be approximately equal to the distance B', B", and B''', respectively, such that contact between the butterfly and housing is downstream from all points where the shaft passes into and through the housing when the valve is closed.

The offset shown in Figs. 3, 4, 6 and 7 is merely one structural means for maintaining continuity of the rim with the housing without any part of the rim traversing that portion of the housing where the operator shaft passes therethrough. Thus in Fig. 8 there is shown a modification wherein the axis of the shaft is neither parallel to nor spaced from the surface of revolution defined by the outer periphery of the butterfly, but passes therethrough by reason of the axis of the shaft forming an angle with the axis of the bore of other than 90°.

Referring to Fig. 8 a valve 100 is shown comprising a housing 111 in which is disposed a butterfly operator shaft 112 having a plate 113 secured at its lower end. It will be observed that the shaft enters the housing at an angle and that the plate is flat on one side, so that in one position of the shaft the flat face of the plate is generally normal to the housing bore.

A butterfly 114 is clamped by means of screws 115 between the flat face of plate 113 and the face of a plate 116 which has a stub shaft 117 secured at its lower end. The shaft 117 is received in a suitable bearing portion in the housing 111. The axes of shafts 112 and 117 coincide and pass through the center of the butterfly 114.

As in the embodiments of Figs. 1–7, the butterfly 114 of Fig. 8 is formed with a curled rim 118, open on one side, and when unconfined it has a diameter slightly greater than the inside diameter of the bore of the housing 111. An actuating shaft coupling 119 engages the operator shaft 112 by means of splines 120, as indicated.

The distinguishing characteristics of the invention over the valves of the prior art may be summarized as follows:

(a) The resilient butterfly rim has a relative stiffness of the order of that of thin metals;

(b) The rim is larger than the bore within which it works, whereby at least two diametrically opposed points on the rim are compressed radially inwardly when the valve is open;

(c) Closure of the butterfly causes succeeding contact points on the rim to have no substantial change of direction with respect to the butterfly proper other than to be deflected radially inwardly toward its central region;

(d) The butterfly moves through less than 90° from its fully open to fully closed positions;

(e) In the fully closed position, the resiliency of the butterfly rim permits it to adapt itself to minor irregularities of the bore along its line of contact therewith, whereby a near-perfect seal is had over its entire peripheral contact with the bore.

(f) Deflection of the resilient rim of the butterfly is had without the necessity of stressing the rim material beyond its elastic limit.

It will be at once apparent to those skilled in the art that, whereas I have shown examples of my invention applied to closure members for cylindrical bores or housings, it is also applicable to those which are non-cylindrical.

I claim:

1. A valve comprising a housing having a round bore, an oscillatable operator shaft extending through the wall of said housing, a butterfly closure member secured to said shaft within said bore, a resilient metal rim on said closure member, said rim being resiliently yieldable toward and from the central region of said closure member, the general plane of said closure member being noncoincidental with the axis of said shaft, the distance between the axis of said shaft and a first portion of said rim on one side of said shaft being greater than the radius of said bore when said valve is open, said first portion of said rim contacting said bore during closing movement of said valve and being first resiliently deformed inwardly until said first portion of said rim passes through a plane normal to the axis of said bore and including the axis of said shaft and thereafter being relieved of said inward deformation, and a second portion of said rim distal of said first portion contacting said bore only after said resilient inward deformation of said first portion of the rim has begun to be relieved, such relieving of said inward deformation tending to urge said second portion of said rim into firm engagement with said bore.

2. A valve comprising a housing having a bore therein, an oscillatable operator shaft shaft extending through the wall of said housing, a closure member secured to said shaft within said bore, a stiffly resilient rim on said closure member, said rim being resiliently yieldable toward and from the central region of said closure member, the general plane of said closure member being noncoincidental with the axis of said shaft, a first portion of said rim on one side of said shaft engaging said bore for a substantial portion of the length of the bore during pivotal closing movement of the valve, said first portion of said rim being progressively deformed inwardly during such engagement with the bore until said first portion of the rim passes through a plane normal to the axis of said bore and including the axis of the shaft, said first portion of the rim thereafter expanding radially during further closing movement and while still in contact with the bore, a second corresponding portion of said rim on the opposite side of said shaft engaging said bore only after said first portion of the rim has passed through the aforesaid plane normal to the axis of said bore.

3. A valve comprising a housing having a bore therein, an oscillatable operator shaft extending through the wall of said housing, a closure member secured to said shaft within the said bore, a stiffly resilient rim on said closure member, said rim being resiliently yieldable toward and from the central region of said closure member, the general plane of said closure member being noncoincidental with the axis of said shaft, a first portion of said rim on one side of the axis of said shaft contacting said bore during closing movement of said valve before a corresponding second portion of the rim on the opposite side of the axis of said shaft contacts said bore, said first portion of said rim being initially resiliently deformed inwardly by the bore until said first portion passes through a plane normal to the axis of said bore and including the center of the axis of said shaft and subsequently being relieved of such deformation by further closing movement of the valve, said second portion of said rim contacting said bore only after said deformation has begun to be relieved.

4. A valve comprising: a housing having a bore; a closure member within said bore, said closure member being provided with yielding rim means; and means for mounting said closure member for rotation, said closure member being displaced on said mounting means in such manner that a point on the rim of the closure member intermediate the intersections of its rotation axis and the wall of the bore contacts the bore before the corresponding rim point on the opposite side of the rotation axis.

5. A valve comprising a housing having a cylindrical bore, an oscillatable operator shaft the axis of which coincides with a diameter of said bore, a butterfly closure member secured to said shaft in spaced relation to the axis of said shaft, said closure member having a rigid central portion surrounded by a generally circular, resilient, continuous metal rim providing a convolution open on one side, said rim being resiliently yieldable in radial directions toward and from the central region of said closure member, the diameter of said rim when unconfined by said bore being greater than the internal diameter of that portion of the bore contacted by said rim in closing the valve, said metal rim being resiliently deformed by the walls of the bore to a generally elliptical shape having a major axis lying in a plane perpendicular to the axis of said shaft and a minor axis intersecting the longitudinal axis of said bore when the valve is closed, the entire perimeter of said rim resiliently engaging said bore in a continuous line contact when said shaft has been rotated through less than 90 degrees from the fully open position of the valve.

6. A valve comprising a housing having a round bore, an oscillatable operator shaft extending through a wall of said housing, a closure member secured to said shaft, the general plane of said closure member being non-coincidental with the axis of said shaft, said closure member having a rigid central portion surrounded by a generally circular, stiffly resilient, continuous rim providing a convolution open on one side, said rim being resiliently yieldable in radial directions, the diameter of said rim when unconfined by said bore being greater than the internal diameter of that portion of the bore contacted by said rim in closing the valve, said rim being resiliently deformed by the walls of the bore to a generally elliptical shape having a major axis lying in a plane perpendicular to the axis of said shaft and a minor axis intersecting the longitudinal axis of said bore when the valve is closed, the entire perimeter of said stiffly resilient rim resiliently engaging said bore in a continuous line contact when said shaft has been rotated through less than 90 degrees from the fully open position of the valve.

7. A valve comprising a housing having a bore, an oscillatable operator shaft extending through the wall of said housing, a closure member secured to said shaft within said bore, a stiffly resilient rim on said closure member, said rim being resiliently yieldable toward and from the central region of said closure member, the general surface defined by the line of contact of said closure member with said bore when closed being non-coincidental with the axis of said shaft, a first point on said closure member contacting said bore and thereby being resiliently deflected radially inwardly thereof before complete closure of said member, a second point on said closure member distal of said first point being the last to contact said bore in closing, said deflection being at least partially relieved after said first point passes through a point on the bore lying on a line normal to both the axis of said bore and to the axis of said shaft as said member approaches complete closure, the relief of said deflection tending to urge said second point of said closure member into firm engagement with the bore.

8. A valve comprising a housing having a bore, an oscillatable operator shaft extending through the wall of said housing, a closure member secured to said shaft within said bore, a stiffly resilient rim on said closure member, said rim being resiliently yieldable toward and from the central region of said closure member, the general surface defined by the line of contact of said closure member with said bore when closed being non-coincidental with the axis of said shaft, a first point on said closure member contacting said bore and thereby being resiliently deflected radially inwardly thereof before complete closure of said member, a second point on said closure member distal of said first point being the last to contact said bore in closing.

9. A valve comprising: a housing having a bore, an oscillatable operator shaft extending through the wall of said housing, a closure member secured to said shaft within said bore, said closure member having a rigid central portion provided at its periphery with a stiffly resilient curled continuous rim formed in the shape of a convolution open on one side, said rim having a major free diameter when unconfined by said bore slightly greater than the diameter of the housing bore in which said closure member operates, said closure member being characterized in that successive points on the periphery of the rim in closing contact said bore in such manner that said points are deflected generally radially inwardly toward the central region of the closure as it is moved toward closed position with no portion of the rim curl having any substantial movement transverse to the general plane of the closure, and the entire perimeter of said stiffly resilient rim resiliently engaging said bore in a continuous line contact when the valve is closed.

10. A valve comprising a housing having a cylindrical bore providing an inlet and an outlet at opposite ends of the bore, an oscillatable operator shaft the axis of which coincides with a diameter of said bore, a butterfly closure member secured to said shaft and displaced axially of the bore from the axis of said shaft when the closure member is in position to close said bore, said closure member having a rigid central portion surrounded by a generally circular, resilient, continuous metal rim providing a convolution open on the side facing said inlet, said rim being resiliently yieldable in radial directions, the normal diameter of said rim being greater than the internal diameter of that portion of the bore contacted by said rim in closing the valve, said metal rim being resiliently deformed by the walls of the bore to an elliptical shape having having a major axis normal to the axis of said shaft and a minor axis intersecting the longitudinal axis of said bore when the valve is closed, the entire perimeter of said rim resiliently engaging said bore in a continuous line contact when said shaft has been rotated through less than 90 degrees from the fully open position of the valve.

11. A valve comprising a housing having a round bore providing an inlet and an outlet at opposite ends of the bore, an oscillatable operator shaft extending through a wall of said housing, a butterfly closure member secured to said shaft and displaced axially of the bore from the axis of said shaft when the closure member is in position to close said bore, said closure member having a rigid central portion surrounded by a generally circular, resilient, continuous metal rim providing a convolution open on the side facing said inlet, said rim being resiliently yieldable in radial directions, the normal diameter of said rim being greater than the internal diameter of that portion of the bore contacted by said rim in closing the valve, said metal rim being resiliently deformed by the walls of the bore to an elliptical shape having a major axis normal to the axis of said shaft and a minor axis intersecting the longitudinal axis of said bore when the valve is closed, the entire perimeter of said metal rim resiliently engaging said bore in a continuous line contact when said shaft has been rotated through less than 90 degrees from the fully open position of the valve.

12. A valve comprising: a housing having a bore, an oscillatable operator shaft extending through the wall of said housing, a closure member secured to said shaft within said bore with the axis of said shaft being non-coincidental with said closure member, said closure member having a rigid central portion provided at its periphery with a resilient curled continuous metal rim formed in the shape of a convolution open on one side, said rim having a major free diameter when unconfined by said bore slightly greater than the diameter of the housing bore in which said member operates, said closure member being characterized in that successive points on the periphery of the rim in closing contact said bore in such manner that said points are deflected generally radially inwardly toward the central region of the closure as it is moved toward closed position with no portion of the rim curl having any substantial movement transverse to the general plane of the closure, and the entire perimeter of said metal rim resiliently engaging said bore in a continuous line contact when the valve is closed.

References Cited in the file of this patent
UNITED STATES PATENTS

| 908,138 | Ricksecker | Dec. 29, 1908 |
| 926,174 | Clark | June 29, 1909 |
| 1,860,619 | Pfau | May 31, 1932 |
| 2,058,996 | Kollberg | Oct. 27, 1936 |

FOREIGN PATENTS

| 19,589 | Great Britain | of 1892 |
| 656,748 | Germany | of 1938 |